June 30, 1931.  S. E. PIERCE  1,811,862
LAWN MOWER ACCESSORY
Filed March 11, 1929
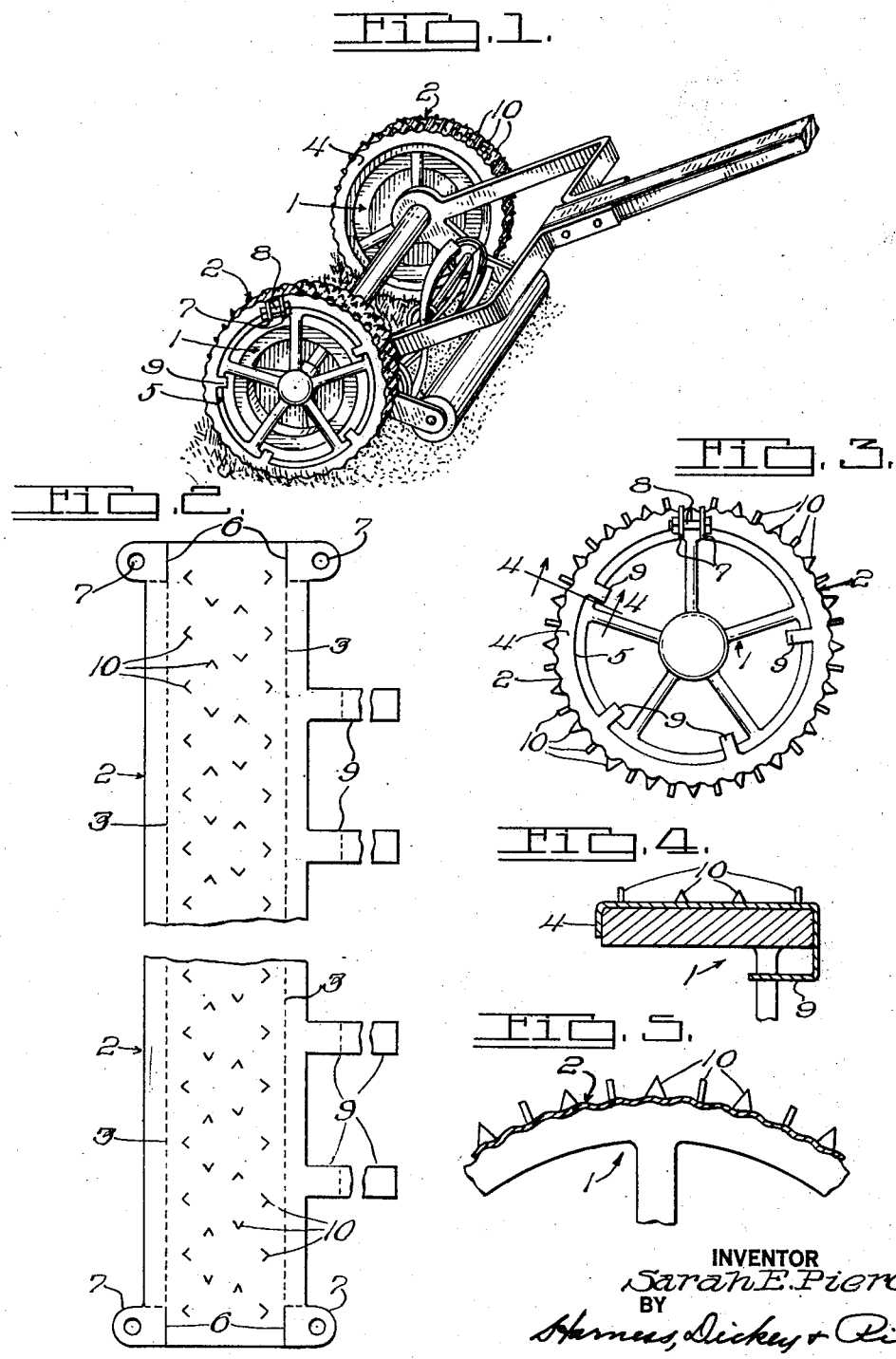
INVENTOR
Sarah E. Pierce
BY
Harness, Dickey & Pierce
ATTORNEY Patented June 30, 1931

1,811,862

UNITED STATES PATENT OFFICE

SARAH E. PIERCE, OF CONSHOHOCKEN, PENNSYLVANIA

LAWN MOWER ACCESSORY

Application filed March 11, 1929. Serial No. 345,940.

This invention relates to traction attachments for wheels and particularly to attachments for improving the traction of lawn mower wheels which may be marketed as an accessory.

In propelling a lawn mower under adverse traction conditions, as up a sharp incline, there is a tendency for the wheels to slip and slide, thus depriving the blades of power. An object of the invention is to provide an inexpensive and readily applicable attachment for lawn mower wheels that will greatly improve the traction properties of the wheels so that the mower can be driven up or along relatively sharp inclines without loss of power, and successfully used under other adverse conditions.

A further object is to provide a one-piece traction band stamped from sheet metal and adapted to peripherally embrace a lawn mower wheel, and having prongs or the like struck out therefrom for improving the traction of the wheel.

The invention further lies in the provision upon such a band of struck-out elements engageable with the wheel to insure a turning of the wheel in unison with said band, or for other purposes.

These and various other objects the invention attains by the construction hereinafter described and illustrated in the accompanying drawings, wherein:

Fig. 1 is a perspective view of a lawn mower equipped with herein described traction appliance.

Fig. 2 is a view of the stamping from which the traction band is formed before being bent.

Fig. 3 shows in elevation the band applied to a lawn mower wheel.

Fig. 4 is a radial sectional view through the rim portion of said wheel taken upon the line 4—4 of Fig. 3.

Fig. 5 is a fragmentary enlarged elevational view partially in section of a segment of one of the wheels showing the traction band engaged therewith.

In these views, the reference character 1 designates the wheels of a lawn mower, which may be either of a manually propelled, or motor-driven type, the former being illustrated, said wheels having the customary transverse corrugations upon their rims to improve traction, as best appears in Fig. 5.

The present invention comprises a suitably stamped sheet metal band 2 proportioned in length to circumferentially embrace the wheels 1 and which may be corrugated transversely (see Fig. 5) to conform to the continuous transverse, corrugations of the wheels 1 so that such corrugations of the band and wheel lie in inter-fitting relationship when the band is applied to the wheel. Said band is bent upon the lines 3 (see Fig. 2) to form flanges 4 and 5 (see Fig. 4) laterally engageable with the rim of the wheel 1, and the ends of said band are each formed along the lines 3 with slits 6 adapting a pair of clamping lugs 7 to be bent from said flanges at right angles thereto for engagement by bolts 8 by which the lugs upon the two extremities are connected to draw the band into firm engagement with the periphery of the wheel.

While the interfitting relation of the corrugations on the band 2 with those of the wheel will suffice to insure a drive from one to the other, such corrugations of the band may be dispensed with, in which case it is preferred to form a series of projecting tongues 9 upon the flange 5 which may be bent beneath the rim, as best appears in Fig. 4, for driving engagement with the wheel spokes.

To afford the band 2 a powerful traction engagement with the surface over which the mower is propelled, a plurality of radial projections are struck out from said band as indicated at 10, said projections preferably having the nature of triangular prongs so as to easily penetrate the surface over which the mower travels. Throughout the surface of the band the relation of these prongs to the plane of rotation of the wheels is varied, certain of the prongs facing the sides of the wheels and others facing circumferentially.

In the use of a lawn mower having its wheels equipped with the described attachments, the prongs penetrate sufficiently into the ground to offer a powerful resistance to any skidding or slipping of the wheels, particularly when the mower is being propelled up an incline, and also to any sliding of the wheels transverse to the plane of their rotation as when the mower is being propelled upon an incline transversely to its slope.

It may be preferable, although not necessary, that the band, after completion and being bent to circular form, be subjected to a case-hardening operation whereby the prongs 10 will better resist the abrasive action of the earth which they will penetrate. This may be accomplished by subjecting the entire band to a cyanide bath, or other suitable case hardening operation. The same result may be obtained by employing sheet steel having a relatively high carbon content in making the band, in which case it will be necessary only to heat the band and then quench it to obtain a suitable hardness of the same.

While said band has been described primarily in its application to one wheel of the mower, it will be understood that preferably both wheels will be equipped with this attachment.

The stamped sheet metal formation of the described device adapts it for quantity production at low cost, and the described means for attaching the band to the wheels is of a very simple nature and permits the bands to be applied or removed in very little time.

While I have shown and described a specific structure, it will be apparent that various modifications in the same may be made without altering the essential features incorporated in the invention. For instance, instead of making the device with full channel section throughout, it will be apparent that the same result may be effected by forming the marginal portions 4 as fingers in the same manner as the tongues 9 are formed. When this is done it is possible to form the device as a continuous ring and simply bend the inner fingers down over the inner edge of the rim of the wheel when assembled thereon to effect the same result as the margin 4. On the inner marginal portion 4 may be completely eliminated in such case and the tongues 9 made sufficiently long to permit the hooking around the wheel spokes to prevent axial displacement of the device.

These and other formal changes may be made in the specific embodiment of the invention described without departing from the spirit or substance of the broad invention, the scope of which is commensurate with the appended claims.

What I claim is:

1. A traction band for attachment to a lawn mower wheel having contiguous transverse corrugations, said band comprising a correspondingly corrugated sheet metal strip for circumferentially embracing the wheel, said strip having integral radial traction projections struck out therefrom, the ends of said strip being laterally fashioned for engagement by fasteners for connecting said ends to clamp the band upon a wheel, one margin of said band being formed with an integral lateral projection adapted to be bent beneath the wheel rim and into driving engagement with the spokes of the wheel.

2. A cylindrical traction band for a lawn mower wheel having transverse corrugations about the periphery thereof, said band comprising a continuous strip of sheet metal of substantially uniform thickness, having continuous side flanges thereon and having corrugations parallel throughout their length corresponding to the corrugations upon the outer periphery of the wheel, traction elements projecting radially from the band and means upon the sides of the band at the ends thereof for contracting it about the wheel.

3. A cylindrical traction band for a lawn mower wheel having transverse corrugations about the outer periphery thereof, said band comprising a continuous strip of case hardened metal of substantially uniform thickness and having parallel corrugations corresponding to the corrugations in the outer periphery of the wheel extending the full width of the band, traction elements projecting radially from and formed integrally with the band, and lugs upon the sides of the band at the ends thereof and means for drawing the lugs toward each other for purposes of contracting the band.

SARAH E. PIERCE.